United States Patent [19]
Johnson et al.

[11] Patent Number: 5,287,697
[45] Date of Patent: Feb. 22, 1994

[54] VARIABLE AREA BYPASS INJECTOR SEAL

[75] Inventors: Kenneth L. Johnson; Donald M. Corsmeier, both of Cincinnati; William L. Weaver, West Chester; Eric H. Lewis, Loveland, all of Ohio

[73] Assignee: General Electric Company, Cincinnati, Ohio

[21] Appl. No.: 816,694

[22] Filed: Jan. 2, 1992

[51] Int. Cl.⁵ ............................................. F02K 3/02
[52] U.S. Cl. .................................... 60/226.3; 60/262
[58] Field of Search ................ 60/226.3, 226.2, 226.1, 60/204, 224, 262

[56]     References Cited
U.S. PATENT DOCUMENTS

| 3,057,541 | 10/1962 | Hasbrouck et al. | 230/114 |
|---|---|---|---|
| 3,579,993 | 5/1971 | Tanner et al. | 60/626 |
| 3,898,799 | 8/1975 | Pollert et al. | 60/226 |
| 4,010,608 | 3/1977 | Simmons | 60/226 |
| 4,026,472 | 5/1977 | Rabone | 239/127.3 |
| 4,043,121 | 8/1977 | Thomas et al. | 60/204 |
| 4,043,121 | 8/1977 | Thomas et al. | 60/204 |
| 4,050,242 | 9/1977 | Dusa | 60/204 |
| 4,054,030 | 10/1977 | Pedersen | 60/262 |
| 4,064,692 | 12/1977 | Johnson et al. | 60/261 |
| 4,068,471 | 1/1978 | Simmons | 60/262 |
| 4,069,661 | 1/1978 | Rundell et al. | 60/204 |
| 4,072,008 | 2/1978 | Kenworthy et al. | 60/261 |
| 4,085,583 | 4/1978 | Klees | 60/204 |
| 4,175,384 | 11/1979 | Wagenknecht et al. | 60/226.3 |
| 4,222,233 | 9/1980 | Johnson et al. | 60/225 |
| 4,285,194 | 8/1981 | Nash | 60/261 |
| 4,390,318 | 6/1983 | Weiler | 415/145 |
| 4,409,788 | 10/1983 | Nash et al. | 60/226.3 |
| 4,813,229 | 3/1989 | Simmons | 60/204 |
| 4,817,378 | 4/1989 | Giffin, III et al. | 60/262 |
| 4,958,489 | 9/1990 | Simmons | 60/226.3 |
| 4,961,312 | 10/1990 | Simmons | 60/204 |
| 5,048,286 | 9/1991 | Stransky et al. | 60/226.3 |
| 5,136,840 | 8/1992 | Nash | 60/226.3 |
| 5,184,840 | 2/1993 | Stransky et al. | 60/262 |

FOREIGN PATENT DOCUMENTS

| 1288767 | 2/1962 | France . |
|---|---|---|
| 0924331 | 4/1963 | United Kingdom . |
| 2083152 | 3/1982 | United Kingdom . |

OTHER PUBLICATIONS

Shigley, Joseph Edward, *Mechanical Engineering Design*, New York; McGraw-Hill, 1977, pp. 313-315.

*Primary Examiner*—Richard A. Bertsch
*Assistant Examiner*—Timothy S. Thorpe
*Attorney, Agent, or Firm*—David L. Narciso; Jerome C. Squillaro

[57]     ABSTRACT

A variable area bypass injector (VABI) seal for a variable cycle gas turbine engine includes a circumferentially segmented seal attached to the diffuser. Each seal segment is spring loaded to allow for different axial movement between circumferentially adjacent segments, and has a seat portion complimentary to a VABI valve conical surface for sealingly engaging the VABI valve when the VABI valve is in closed position. Additionally, the seal segments are shaped with a low aerodynamic profile and cooperate with the VABI valve conical surface, when the valve is in an open position, to provide an annular conic channel that keeps the bypass flow attached to the VABI valve and core flowpath walls as it is injected into the core gas stream.

7 Claims, 13 Drawing Sheets

VARIABLE AREA BYPASS INJECTOR SEAL

The United States Government has rights in this invention pursuant to Contract No. F33657-83C-0281 awarded by the Department of the Air Force.

TECHNICAL FIELD

The present invention relates generally to variable cycle gas turbine engines and more specifically to apparatus for actuating and sealing a rear variable area bypass injector (VABI).

BACKGROUND OF THE INVENTION

A variable cycle gas turbine engine, such as disclosed in U.S. Pat. No. 4,175,384 to Wagenknecht, et al., and incorporated herein by reference is capable of acting as both a turbojet and a turbofan by varying the bypass ratio of the engine. A conventional variable cycle gas turbine engine will include a fan, a midfan or low pressure compressor, a high pressure compressor, combustor, high pressure turbine, low pressure turbine, and an augmentor in serial flow relationship. A bypass duct supplies bypass air from the fan and the low pressure compressor to the rear VABI where the bypass air can be returned to the core engine gas flow. Conventionally, the rear VABI is located aft of the low pressure turbine and forward of the augmentor. An augmentor conventionally includes a diffuser section, a flameholder and an augmentor screech suppressor. All or a portion of the bypass flow can be diverted to an augmentor cooling plenum where it can be injected through the augmentor cooling liner which includes a screech suppressor liner. This coolant flow protects the augmentor liner, as disclosed in U.S. Pat. No. 4,183,229 to Simmons. In order for bypass air to flow through the augmentor liner into the augmentor, it is necessary for the pressure of the bypass air in the cooling plenum to be higher than that of the core airflow through the augmentor. It has also been found that in order to enhance the performance of a variable cycle engine and avoid fan stall or compressor stall, it is necessary that the appropriate pressure ratio between those areas of the engine and the pressure in the augmentor be controlled. For additional information concerning the necessity to maintain the appropriate pressure ratios in a variable cycle engine and the use oaf a rear VABI for such control, reference can be had to co-pending application Ser. No. 07/504,380.

It has been found that in order to enhance the turbojet cycle of a variable cycle engine, the rear VABI needs to provide a better seal when in a closed position than has been previously achieved in order to conserve bypass air for coolant flow through the augmentor liner. This is particularly difficult considering manufacturing and assembly tolerance stackup that cause differences in how much travel is necessary for a VABI door or valve mechanism to close at different circumferential locations. It has also been found that to enhance the turbofan cycle of a variable cycle engine, the rear VABI should be configured to preserve momentum of the bypass airflow as it is injected into the core airstream. Preserving the momentum of the bypass airflow is best achieved when the velocity of the bypass airflow approximates the velocity of the core gas flow. It has been found that this velocity matching is usually closest aft of the diffuser. It has also been found that prior VABI configurations injecting relatively cool air forward of the augmentor can create unstable flame and auto ignition problems in the augmentor. Further, there have been problems with hot and cold streaks as cool bypass air is injected into the hot core gas airstream through prior VABI configurations, inducing thermal stresses due to the differing temperature gases flowing past flowpath surfaces aft of the VABI. Attempting to locate the rear VABI aft of the flameholders and diffuser lengthens the distance between the flameholder and screech suppressor, dimishing the suppressor's effectiveness. This also introduces new problems in configuring the VABI to fit within the smaller bypass duct area available aft of the diffuser.

SUMMARY OF THE INVENTION

In accordance with the present invention, it is desirable to provide a variable area bypass injector (VABI) that can achieve a tight seal, in spite of manufacturing and assembly tolerance stackup, for enhanced turbojet cycle operation of the variable cycle gas turbine engine.

It is also desirable to provide a VABI configuration aft of the diffuser that will conserve the momentum of the bypass air when in an open position to enhance the turbofan cycle operation of the variable cycle engine.

It is additionally desirable to provide a VABI that can be located aft of the flameholders in an augmentor in order to minimize the problem of flame instability from the introduction of relatively cool bypass air into an augmentor.

It is additionally desirable to provide a VABI that will inject the bypass air in a substantially circumferentially continuous manner to minimize problems from hot and cold streaks.

It is further desirable to provide a VABI aft of augmentor flameholders that includes a screech suppressor to minimize the axial distance from flameholder to screech suppressor, optimizing suppressor performance.

The present invention includes a variable area bypass injector (VABI) for a variable cycle gas turbine engine having a circumferentially continuous valve with a conical surface sloping into a screech suppressor surface for directing bypass air into the core engine airflow, keeping the bypass flow attached to the screech suppressor flow defining surface. A segmented circumferential seal is attached to the diffuser. Each arcuate segment includes a complementary conical sealing surface for sealingly engaging the conical valve surface. Means for actuating the VABI valve are located outside the outer duct of the engine. In a preferred embodiment, the segmented seals are spring loaded and allow different axial movement between circumferentially adjacent segments allowing for sealing engagement in spite of manufacturing and assembly tolerance stackup. Additionally, the seal is shaped with a low aerodynamical profile and cooperates with the VABI conical surface to provide an annular conic channel that keeps the bypass flow attached to the VABI valve and core flowpath walls as it is injected into the core gas stream.

Major advantages of this VABI system include the low profile aerodynamic seal which allows for enhanced performance of a variable cycle engine by substantially sealing to conserve the bypass airflow when it is not needed, and to keep the flow attached on the seal when the VABI is in an open position. The momentum of the airflow is thus preserved as it is injected into the core airstream, enhancing the turbojet performance of the engine. The low profile of the VABI configuration also allows for positioning the rear VABI aft of the diffuser and flameholders where the bypass duct is smaller. This position has been found better than other locations for preserving bypass airflow momentum in addition to enhancing augmentor operation by injecting the relatively cool bypass flow aft of the flameholders. Additionally, by having a circumferential opening, the cool gas stream being injected into the hotter airflow is circumferentially continuous, minimizing hot and cold streaks which cause circumferential thermal distortions within the augmentor. Having an aerodynamically shaped circumferential VABI also provides for highest flow in the shortest axial distance or opening required of the VABI.

These and other features and advantage of the present invention will become apparent to those skilled in the art from the detailed description of the preferred embodiment when taken in conjunction with the accompanying drawings.

BRIEF DESCRIPTION OF THE DRAWINGS

In the course of the following detailed description, reference will be made to the accompanying drawings in which.

DETAILED DESCRIPTION OF THE PREFERRED EMBODIMENT

Figure 1:
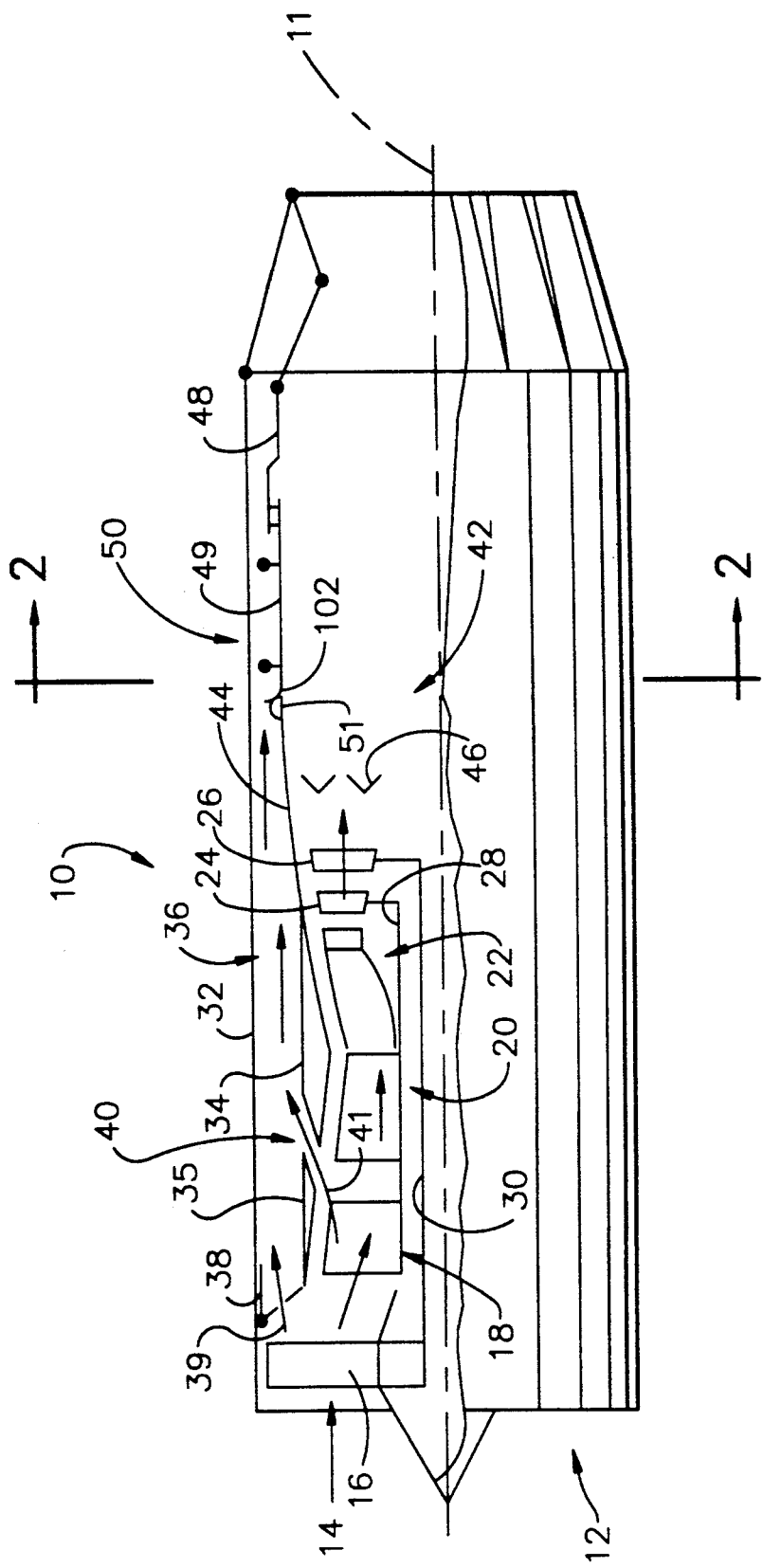
FIG. 1 is a schematic representation of a variable cycle gas turbine engine.

Like reference numerals have been used to designate like or corresponding parts throughout the several views.

Illustrated in FIG. 1 is a schematic representation of an exemplary variable cycle gas turbine engine 10 having a longitudinal centerline 11. The engine 10 includes an annular inlet 12 for receiving ambient air 14 followed in axial flow relationship by a conventional forward fan 16, an aft fan 18 or low pressure compressor 18, a high pressure compressor (HPC) 20, a combustor 22, a high pressure turbine (HPT) 24, a low pressure turbine (LPT) 26 and an augmentor 42. The HPT 24 powers both the aft fan 18 and HPC 20 through a conventional first shaft 28. The LPT 26 powers the forward fan 16 by a conventional second shaft 30. The engine 10 further includes an outer casing 32 which is spaced from an inner casing 34, including a forward section of the inner casing 35 defining a conventional bypass duct 36. Engine 10 further includes a forward bypass valve 38 such as disclosed in co-pending application Ser. No. 07/522,346, filed May 11, 1990 now U.S. Pat. No. 5,113,641, or U.S. Ser. No. 07/522,024, also filed May 11, 1990 now U.S. Pat. No. 5,184,461, both of which are assigned to the same assignee as the present invention and are incorporated herein by reference. Under certain engine operating conditions, the forward bypass valve 38 will allow fan bypass air 39 to enter bypass duct 36. An aft fan extraction channel 40 is also provided that limits compressor bypass air 41 entering bypass duct 36, such as disclosed in U.S. application Ser. No. 07/506,314, filed Apr. 9, 1990, now U.S. Pat. No. 5,115,993 assigned to the same assignee as the present invention and the disclosed material of which is incorporated herein by reference. Augmentor 42 includes a diffuser 44, a flameholder 46, and an augmentor liner 48, as well as a screech suppressor portion 49 in the augmentor liner 48. A VABI of the present invention is generally indicated at 50. The VABI includes a VABI seal 51 and a VABI valve 102.

Figure 2:
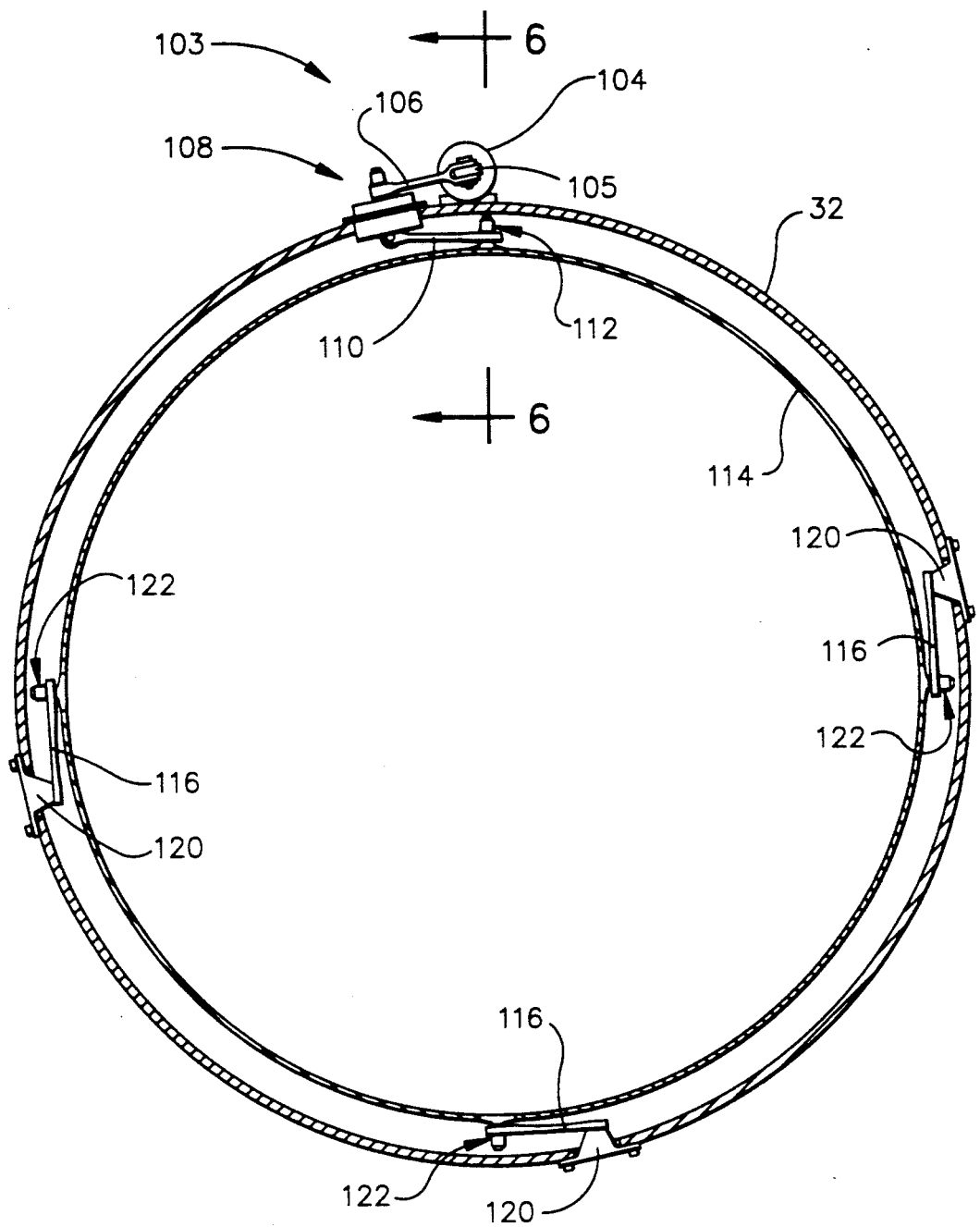
FIG. 2 is an illustration of a cross-sectional view looking aft along the lines of 2—2 of FIG. 1, showing an actuation mechanism for a VABI, including actuation means and follower means.

FIG. 2 is an aft looking view of the actuation mechanism 103 for the VABI valve 102. Actuation mechanism 103 includes a linear actuator 104 connected to an outer casing 32. Actuator rod 105 extends from linear actuator 104 and is connected to an outer crank arm 106. Outer crank arm 106 is splined to a spindle, bearing assembly 108 which is connected to outer casing 32 and which acts to transmit rotation through the outer casing to an inner crank arm 110. Inner crank arm 110 is connected by a first spherical bearing 112 to a VABI valve structure 114. VABI valve structure 114 also acts as a forward end of a screech suppressor housing. Three follower or idler arms 116 are shown connected to the outer casing 32 by idler arm supports 120 through a second spherical bearing 118, visible in view 5, and to the VABI valve structure 114 at a third spherical bearing 122. For clarity, the VABI valve and screech suppressor liner are not shown in FIG. 2.

Figure 3:
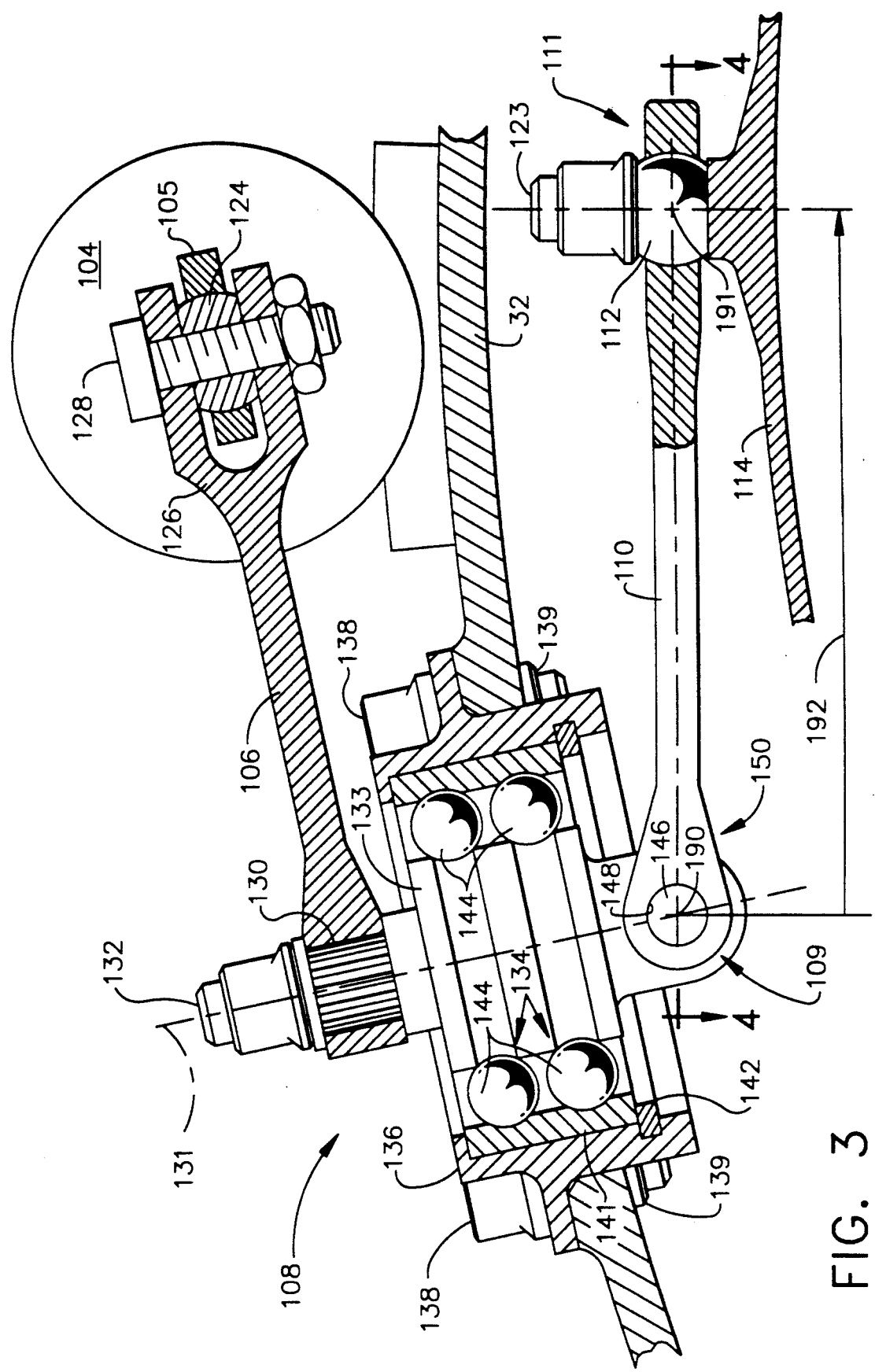
FIG. 3 is an enlarged view of the actuation means 103 shown in FIG. 2 with partial cross section through spindle bearing assembly 108.
Figure 4:
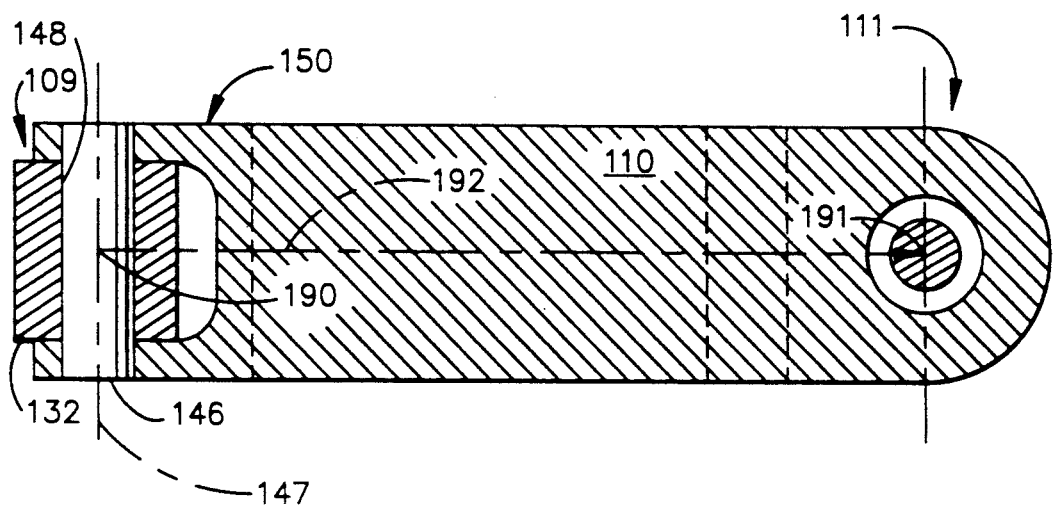
FIG. 4 is an illustration of a plan view in partial cross section of an inner crank arm along lines 4—4 in FIG. 3.

FIG. 3 is an enlarged view of the actuation mechanism 103 shown in FIG. 2. Actuator rod 105 is shown including a spherical bearing 124 engaging a clevis portion 126 of outer crank arm 106 by bolt 128. Outer crank arm 106 is fixed to the spindle bearing assembly 108 at spline portion 130 of spindle bearing shaft 132. Spindle bearing assembly 108 includes a bearing housing 136 and an outer race 141, having dual ball bearing races. Outer race 141 is held in place by locking ring 142. A dual row 134 of ball bearings 144 are located between the outer race 141 and inner race 133. The spindle bearing housing 136 is connected to the outer casing 32 by bolts 138 threadingly engaging inserts 139 located within the outer casing 32. Pin 146 through bore 148 in the spindle bearing shaft 132 engages a clevis portion 150 at inner crank arm 110 first end 109. Inner crank arm 110 has a second end 111 which is connected to a stud 123 on the VABI valve structure 114 by a spherical bearing 112. Inner crank arm 110 has a first pivot point 190 at the intersection of axis 131 of the spindle bearing shaft 132 with axis 147 of pin 146 and a second pivot point 191 at the center of spherical bearing 112. A first pivot radius 192 is defined as extending between the first pivot point 190 and the second pivot point 191. FIG. 4 is a top plan view in partial cross section of the inner crank arm 110 showing pin 146 engaged with clevis portion 150 of inner crank arm 110 and bore 148 of spindle bearing shaft 132. The relationship between the first and second pivot points 190 and 191, respectively, and the first pivot radius 192 is shown.

Figure 5:
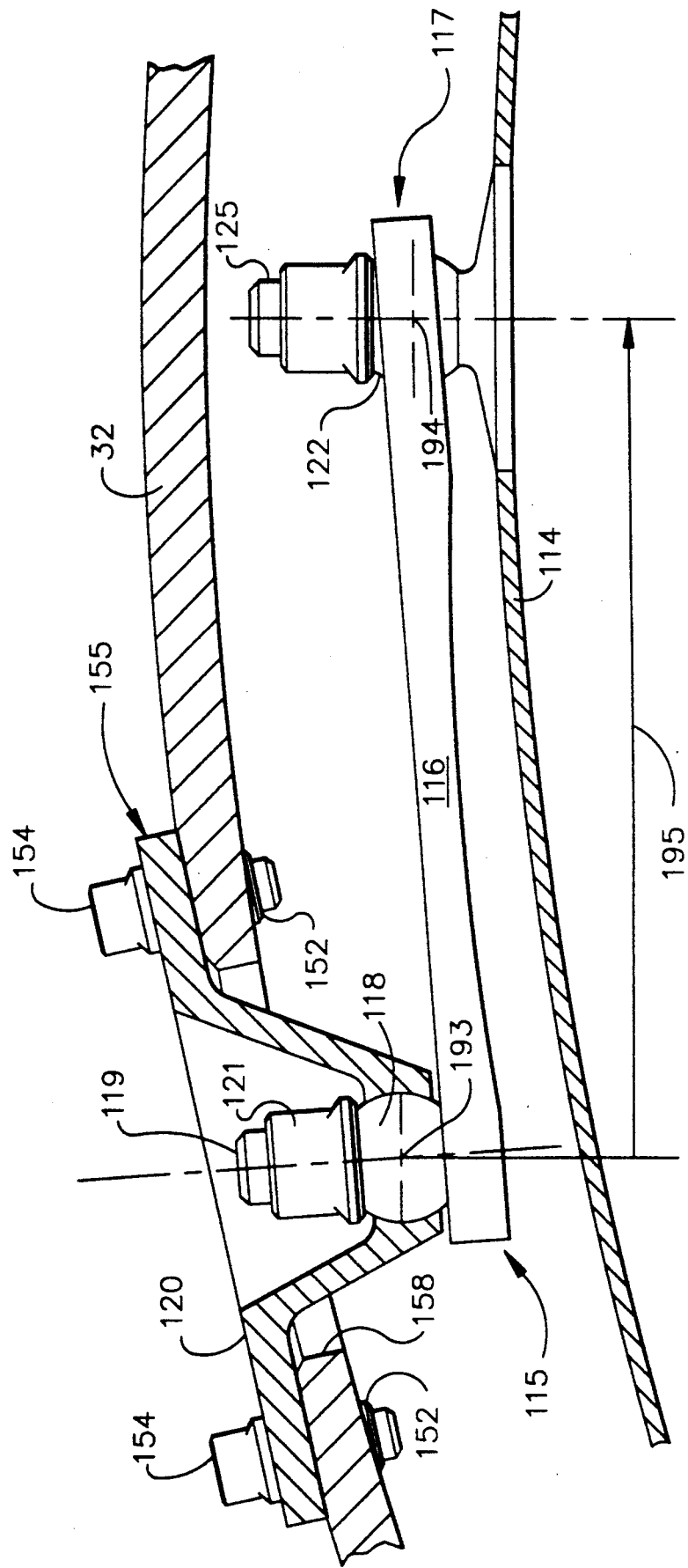
FIG. 5 is an illustration of an enlarged view of the follower means of FIG. 2 showing one idler arm.

FIG. 5 is an enlarged view of an idler arm 116 coupled to outer casing 32 and VABI valve structure 114. First end 115 of idler arm 116 is connected at second spherical bearing 118 by nut 121 engaging stud 119 extending from idler arm 116. Second spherical bearing 118 is captured within idler arm support 120 which is mounted to outer casing 32 by bolts 154 through the four-bolt flange portion 155 and engaging inserts 152 in casing 32. Idler arm 116 second end 117 is coupled to a third spherical bearing 122, which is mounted on valve structure stud 125. Idler arm 116 has third pivot point 193 located at the center of spherical bearing 118 and fourth pivot point 194 at the center of spherical bearing 122 defining a second pivot radius 195.

Figure 6:
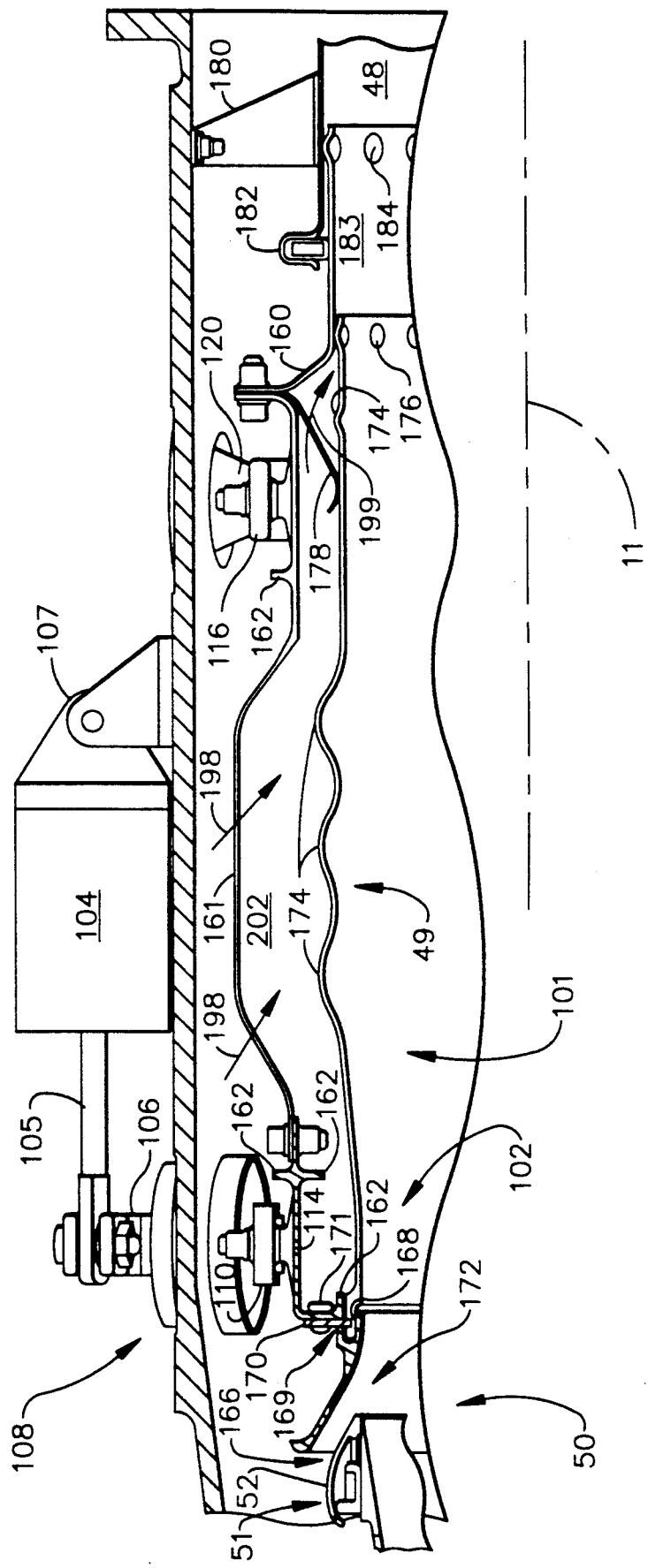
FIG. 6 is an illustration of a cross-sectional view of the VABI along lines 6—6 of FIG. 2 with the VABI in a mid-open position.

FIG. 6 is an illustration of a cross-sectional view along lines 6—6 of FIG. 2 showing the VABI valve 102 in a position midway between fully open and fully closed such that inner crank arm 110 and idler arm 116 are parallel to a plane perpendicular to the longitudinal axis 11 of the engine 10. In this preferred embodiment, the VABI valve structure 114 also serves as a forward section of a screech suppressor housing coupled to a mid-screech suppressor housing 161 which is in turn coupled to an aft screech suppressor housing 160. The housing 114, 160, and 161, with the screech suppressor liner 49 defines a resonator cavity 202 which works substantially as a conventional screech suppressor. However, this configuration of a screech suppressor, generally indicated at 101, includes the improvement of being a screech suppressor 101 coupled to a rear VABI, and also the improvement of being a translating screech suppressor, i.e., screech suppressor 101 can move axially forward and aft. The screech suppressor housing portions 114, 160, and 161 include stiffening flanges 162. VABI valve structure 114 includes an aerodynamically-shaped VABI valve inlet 166, an axial screech suppressor liner mounting slot 168 and a number of circumferentially spaced radial slots 169 for installation of screech suppressor retainers 170. Screech suppressor retainer 170 is riveted at 171 to the VABI valve structure 114. Screech suppressor liner 49 has structural stiffening rings 174 to prevent buckling and resist thermal distorton from hot streaks. Standoff dimples 176 are provided to insure film cooling of the aft screech suppressor liner section 183. Liner support baffle 178 comprises a leaf seal with slots to meters cooling flow 199 for this film cooling and supports the aft end of the screech suppressor liner 49. Aft liner hangars 180 center the augmentor liner 48 and screech suppressor liner 49 and includes a liner seal housing 182. Standoff dimples 184 on aft screech suppressor section 183 hold the edge of aft screech suppressor section 183 away from 48, preventing aft screech suppressor section 183 from damaging augmenter liner 48 as screech suppressor liner 49 translates aft. In addition, this gap provides cooling flow through the aft screech suppressor section 183. Actuator 104 is shown as being attached to outer casing 32 by a spherical bearing 107.

Figure 7:
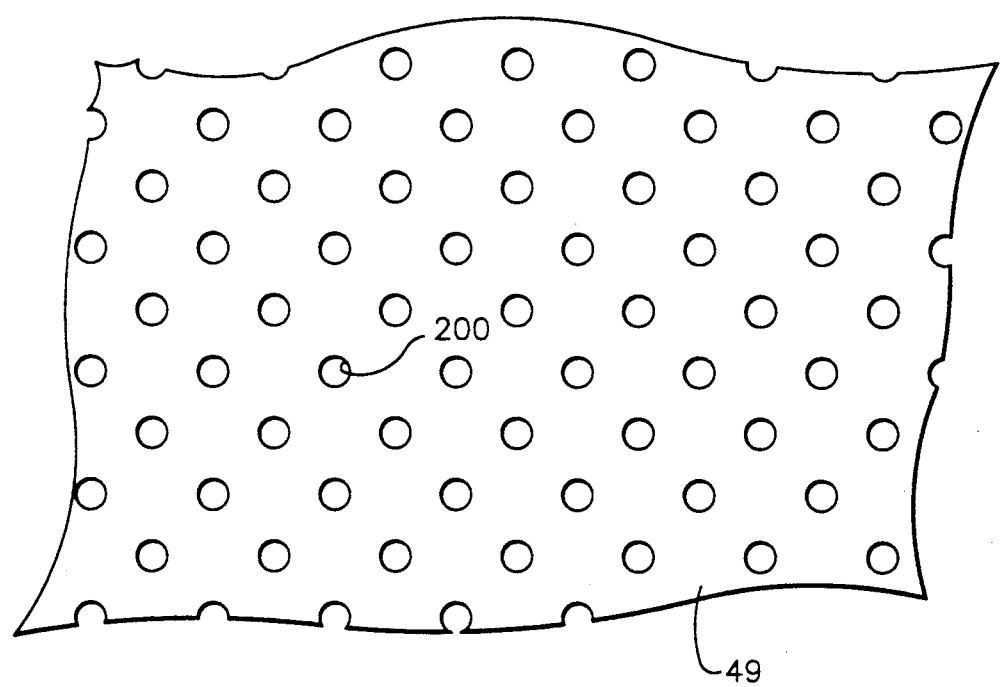
FIG. 7 is an illustration of an enlarged plan view of a screech suppressor 49 in FIG. 6.

FIG. 7 is an illustration of an enlarged plan view of the screech suppressor liner 49 showing screech suppressor holes 200.

Figure 8:
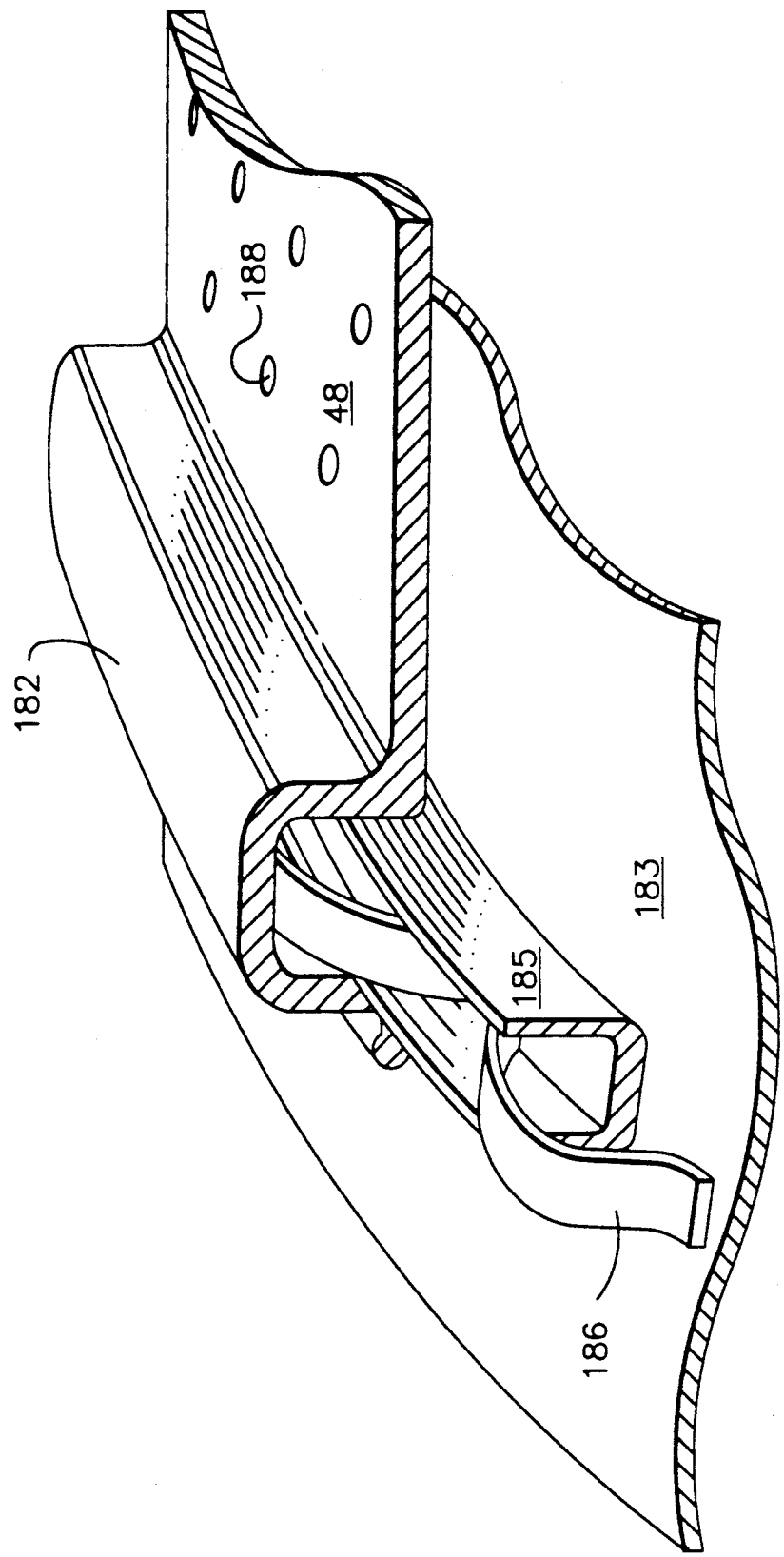
FIG. 8 is an illustration of an enlarged perspective view of an aft screech suppressor seal.

FIG. 8 is an illustration of an enlarged perspective view in partial cross section to more specifically show the sealing mechanism for the aft end of the translating screech suppressor liner at housing 182 in FIG. 6. Plunger seal 185 is located within afterburner liner seal housing 182 and biased inwards by wave spring 186. Cooling holes 188 provide metered cooling through the aft afterburner liner 48. The plunger seal 185 is preferably a one-piece circumferentially-shaped split ring seal of a slightly smaller diameter than the diameter of the afterburner aft screech suppressor section 183. In this way, the plunger seal 185 is always providing an inward spring force when installed over the larger diameter liner. This spring force is augmented by a multiplicity of wave springs 186 biasing against housing 182 and plunger seal 185 such that as the afterburner liner aft screech suppressor section 183 expands and contracts, the plunger seal does not bind within housing 182.

Figure 9:
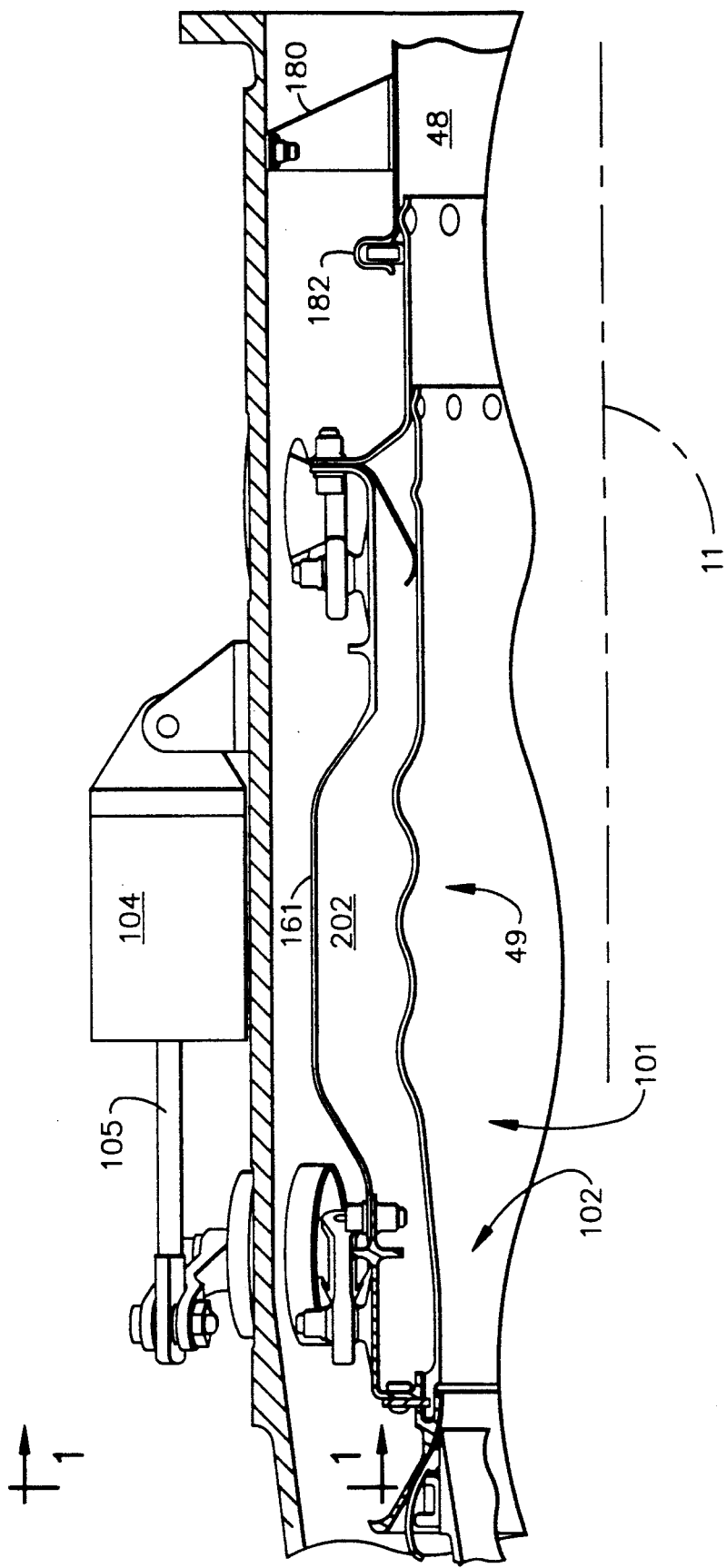
FIG. 9 is an illustration of a cross-sectional view of FIG. 6 with the VABI in a closed position.
Figure 10:
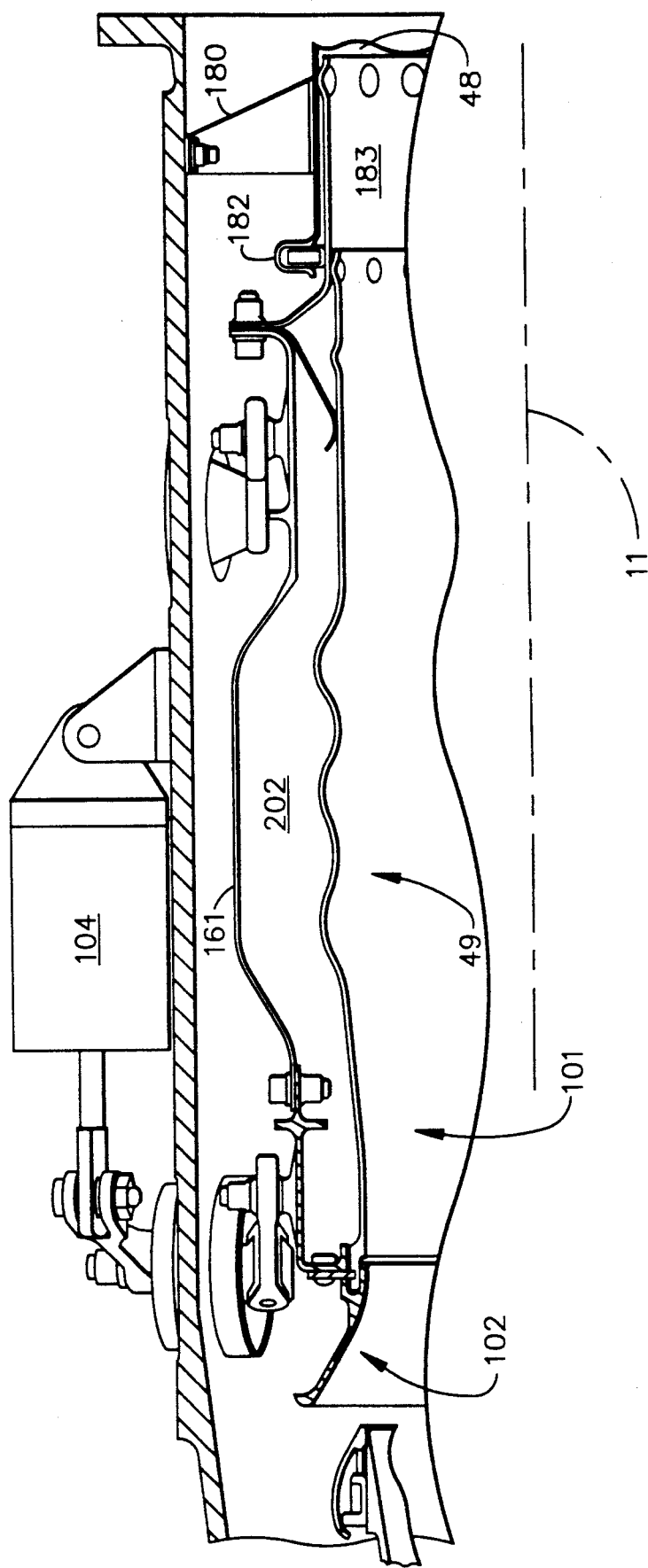
FIG. 10 is an illustration of a cross-sectional view of the VABI of FIG. 6 in an full-open position.

FIG. 9 shows the VABI 50 in a closed position showing the inner crank arm 110 and the idler arm 116 having translated through a similar degree of motion while remaining parallel to each other. FIG. 10 shows the VABI 50 in a full open position with the inner crank arm 110 and idler arm 116 again maintaining a parallel relationship.

Figure 11:
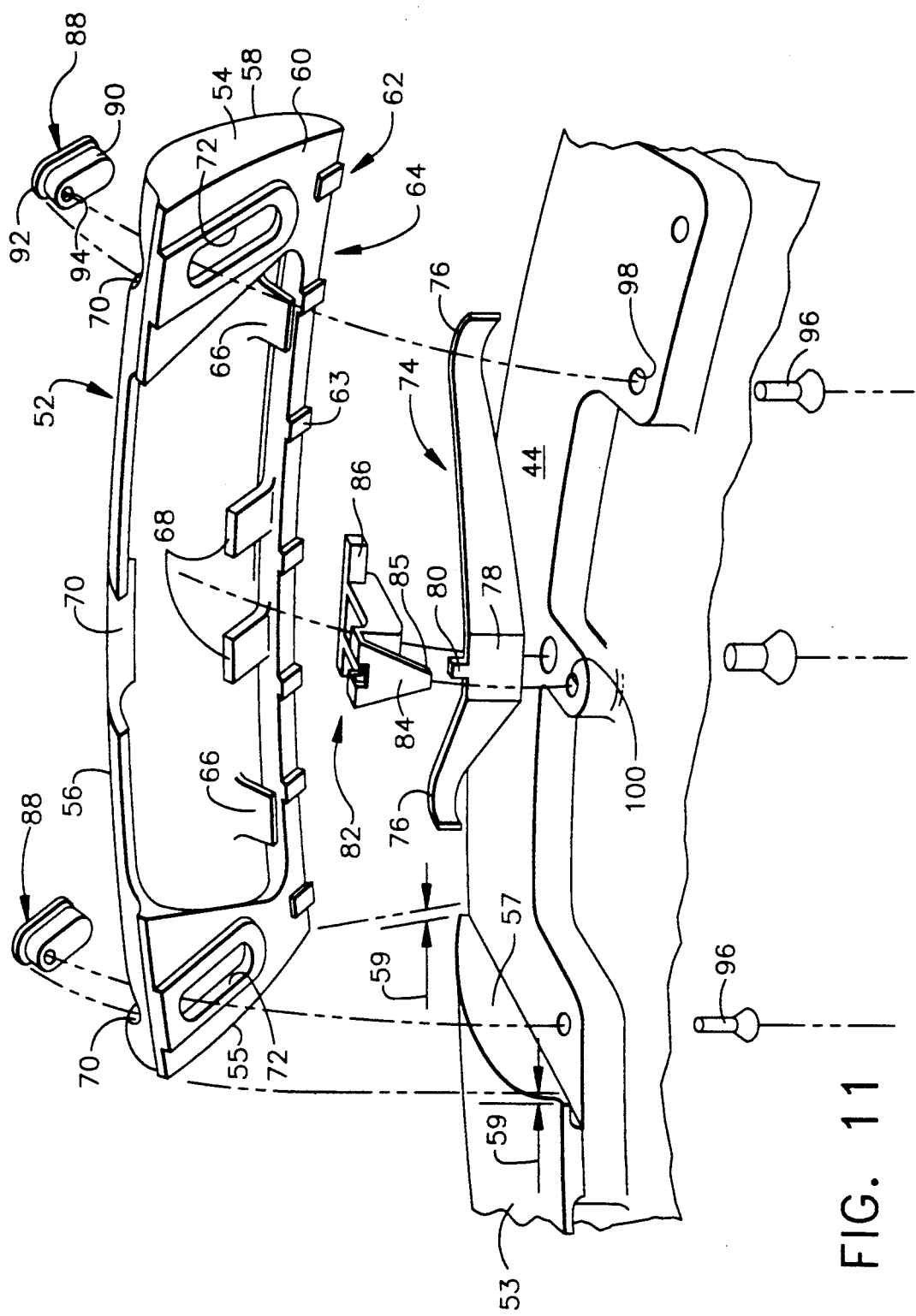
FIG. 11 is an illustration of an exploded perspective view of a portion of the VABI seal.

FIG. 11 shows an exploded view of the seal assembly showing a VABI seal segment 52 that will be installed next to a circumferentially adjacent segment 53. A side 55 of seal body 54 and a side 57 of adjacent seal segment 53 in an installed position will define a gap 59 which in a preferred embodiment will be approximately 0.050 inches plus or minus 0.02 inches. This gap needs to be narrow to minimize leakage, but wide enough to allow for stackup tolerance and potential axial twisting of the segments during operation. Seal body 54 has a top surface 56 with an arcuate portion that serves as an aerodynamic shape to keep bypass flow attached. A slanted portion or seat 58 is adapted to meet the sealing surface 167 of VABI valve 102, shown in FIG. 13. Bottom portion 60 of VABI seal body 54 includes a stepped portion 62 with standoffs 63 that are adapted to slide-on the diffuser 44 while providing cooling air slots 64 to continuously cool the seal and for backside cooling of diffuser 44. Cooling air slots 64 provide a metered amount of coolant flow when the VABI 50 is in a closed position. Seal body 54 includes spring pads 66 and aft retainer tabs 68 which hold the aft edge down. Assembly access holes 70 provide room to upset rivet 96, heads which protrude through obround spools 88 in obround slots 72.

A leaf spring 74 includes seal contact surfaces 76 for engaging spring pads 66 and biasing seal segment 52 aft towards the VABI valve 102. The leaf spring 74 also includes a retainer engaging portion 78 and a spring locking tab 80. Retainer 82 includes a spring support flange 84 for reacting the axial forces of the spring and anti-rotation portion 85 adapted to be inserted in a slot 100 in diffuser 44. The retainer 82 also includes tab restraining arms 86 for engaging aft retainer tabs 68 to retain aft edge of seal segment 52 in contact with VABI diffuser 44. Obround spools 88 are riveted into obround slots 72 with an obround slot engaging surface 90 to provide axial alignment and a retainer flange 92 for restraining the forward edge of seal 52 from lifting off diffuser 44. The seal segment 52 is installed by installing rivets 96 from the diffuser gas path side through holes 98 and into the holes 94 in obround spools and in retainer 82 with the rivets formed or upset from the seal side through assembly access holes 70.

Figure 12:
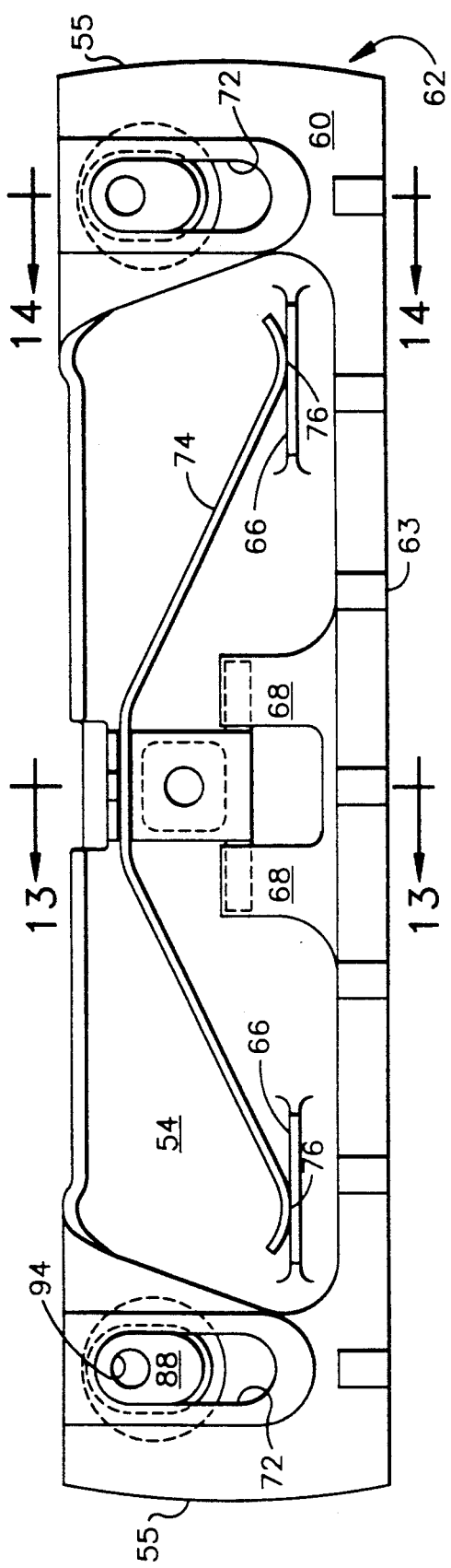
FIG. 12 is an illustration of a plan view from the bottom of the seal segment of FIG. 11.
Figure 13:
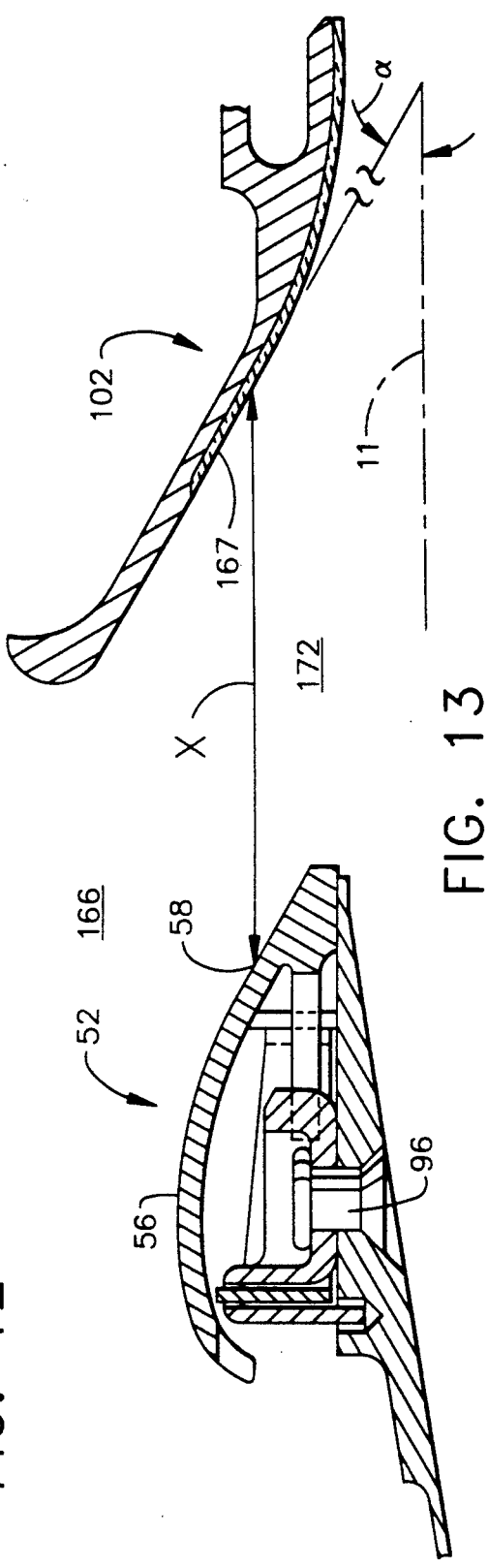
FIG. 13 is an illustration of a cross-sectional view of the VABI along lines 13—13 of FIG. 12.
Figure 13A:
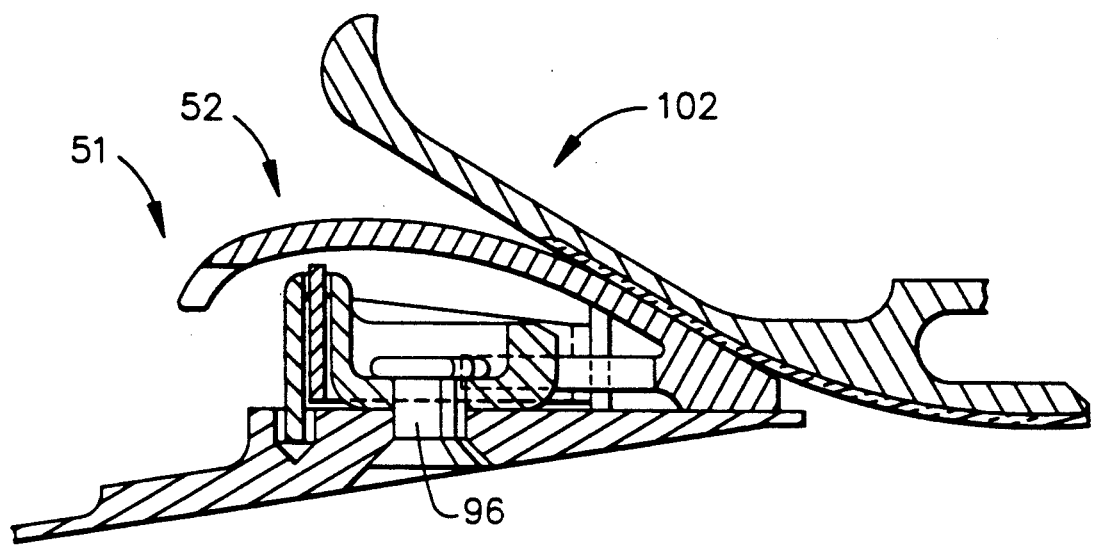
FIG. 13A is an illustration of a cross-sectional view of the VABI of FIG. 13 with the VABI valve engaging the VABI seal.
Figure 13B:
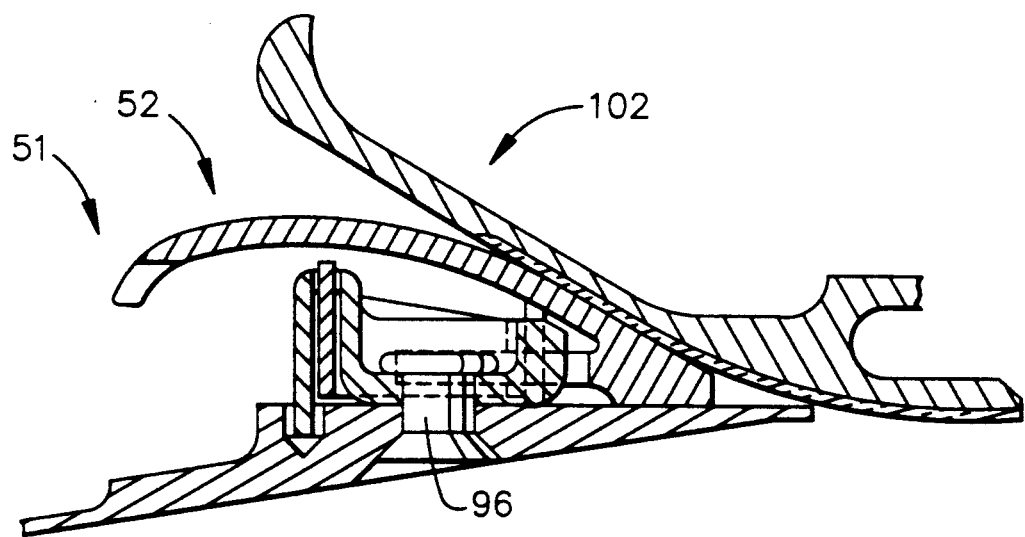
FIG. 13B is an illustration of a cross-sectional view with the closed VABI valve displacing the VABI seal.
Figure 14:
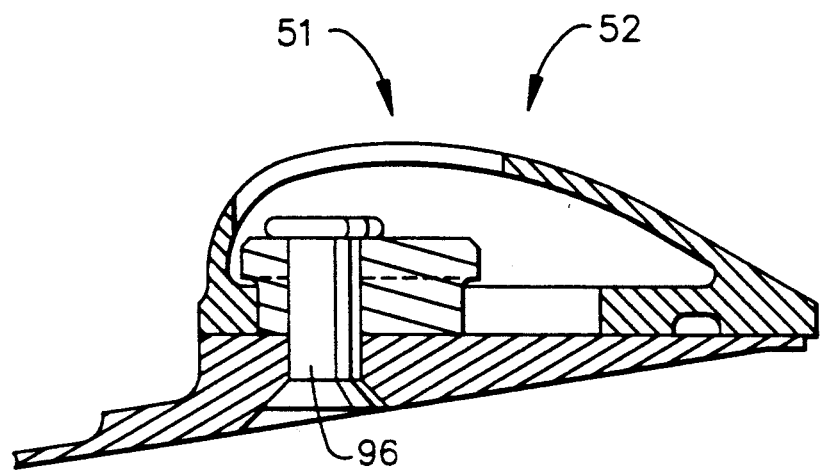
FIG. 14 is an illustration of a cross-sectional view of the VABI seal along lines 14—14 in FIG. 12.
Figure 14A:
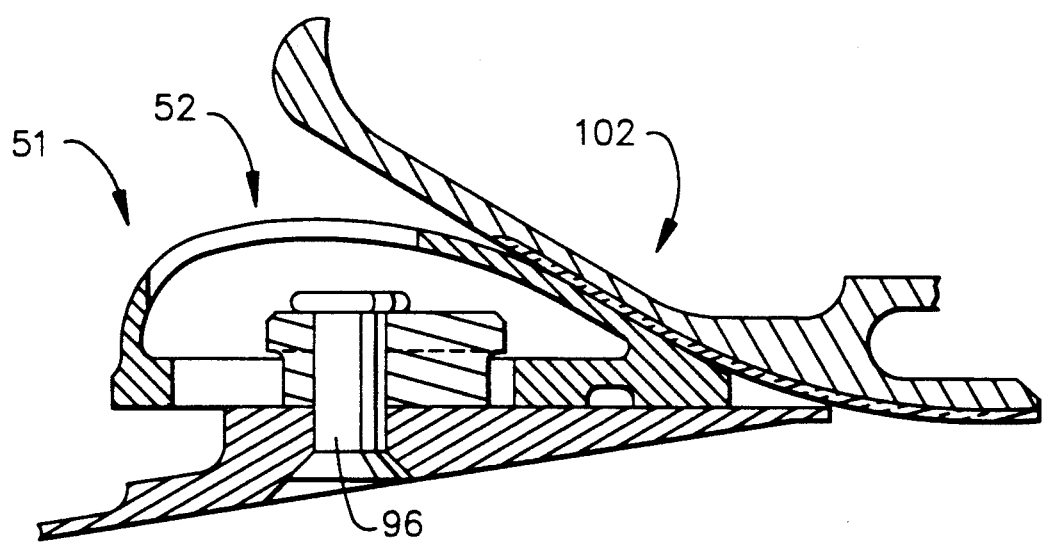
FIG. 14A is an illustration of a cross-sectional view of the VABI seal in closed position along lines 14—14 of FIG. 12.

FIG. 12 is a view from the bottom of the seal segment. FIG. 13 is taken along section 13—13 of FIG. 12, with the VABI in open position. Seal segment 52 is shown as including the arcuate portion 56 of the top surface gradually sloping into the slanted seat portion 58. The VABI is shown in an open position with the VABI valve 102, slanted sealing surface 167, shown as having an angle alpha with respect to the engine longitudinal centerline 11. As the slanted sealing surface 167 is circumferentially continuous, it defines a conical surface that cooperates with the slanted portion 58 on each seal segment 52 such that an annular conic channel 172 is formed for injecting bypass air into core airflow. Slanted sealing surface 167 curves at its radially inner side until it is substantially continuous with the screech suppressor liner 49, thus providing an aerodynamic surface that will keep the bypass airflow attached as it is injected. It has been found that the angle alpha should be approximately 30 degrees to maintain the bypass airflow momentum as it is injected into the core airflow. It has also been found that by providing a seal segment 52 with the aerodynamically shaped arcuate portion 56 in combination with the slanted portion 58, better airflow characteristics are provided than with no seals installed at all in the same open valve 102 position. FIG. 13A depicts the VABI valve 102 sealingly engaging the seal and FIG. 13B shows the VABI valve 102 axially displacing the VABI seal segment 52 when in sealing engagement. The circumferentially segmented VABI seal 51 allows for different seal segments 52 to have differing axial locations as shown in 13A and 13B with the VABI valve 102 fully engaged, thus allowing for manufacturing and installation stackup tolerances and thermal distortion of the complementary circumferential surfaces. FIG. 14 is an illustration of a cross-sectional view along line 14—14 of FIG. 12 with FIG. 14A showing the VABI in fully closed position.

In a preferred embodiment, the VABI acutation mechanism will include at least one actuator with its first pivot point 190 in the same plane perpendicular to the axis of the engine with at least two follower or idler arms 116 third pivot points 193, with at least three follower or idler arms 116 third pivot points 193 located in a second plane perpendicular to the engine axis. Best performance of the linkage will be achieved by providing the most axial distance between the first and second planes. The first pivot radius of the crank arm and the second pivot radius of each of the idler arms needs to be substantially equal. It is necessary for installation that the angles of the pivot radii with respect to a radius extending from the engine axis through the first and third pivot points with respect to a plane parallel to a plane perpendicular to the engine axis are the same such that as the actuation arm rotates the follower arms will rotate in a parallel fashion. A minimum of three arms in each of two planes provides that the VABI and screech suppressor liner will translate axially while remaining concentric with the outer duct. By providing two sets of arms axially separated, the inner and outer cylindrical engine members are able to remain concentric with each other through a range of motion. Further, by placing the mid-open position of the VABI stroke such that the actuator and idler arms are in perpendicular plane to the longitudinal axis of engine, a minimum amount of linear actuator stroke is needed to open or close the valve. In determining the amount of stroke necessary to close the valve, consideration must be made to the amount of manufacturing tolerance stackups, thermal distortions, and other factors effecting out-of-round characteristics of the valve side or the seal side of the VABI. In determining the amount of axial VABI seal travel necessary, the manufacturing, assembly, and thermal growth differences are added so that the VABI can close and fully engage circumferential seal surfaces while allowing for additional travel if necessary from an unforeseen out-of-round condition. In this manner, damage to either the seal or the actuator or the valve will be prevented.

The present invention in many of its intended advantages will be understood from the foregoing description and it will be apparent that various changes may be made in the form, construction and arrangement of the parts thereof without departing from the spirit and scope of the invention or sacrificing its material advantages, the apparatus hereinabove described being a preferred and exemplary embodiment.

What is claimed is:

1. A variable area bypass injector (VABI) seal segment for sealingly engaging a VABI valve in a gas turbine engine including an inner casing, said VABI seal segment comprising:
   a seal body including an arcuate portion, a slanted sealing surface, and a bottom portion, said arcuate portion curving into said slanted sealing surface and said bottom portion for slidingly engaging the inner casing;
   biasing means; and
   retention means coupling said biasing means to said seal body and coupling said seal body to the inner casing.

2. The VABI seal segment of claim 1, further comprising said bottom portion including standoffs slidingly engaging a diffuser section of the inner casing, providing cooling air slots to cool said seal segment.

3. The VABI seal segment of claim 1 wherein said biasing means comprises a leaf spring urging said seal segment towards the VABI valve.

4. A variable area bypass injector (VABI) seal for substantially sealing a VABI, comprising:
   a series of circumferentially adjacent seal segments, each of said seal segments comprising a seal body having an arcuate portion curving into a slanted sealing surface on said seal segments complementary to a conical VABI valve surface, a bottom portion for slidingly engaging an inner casing of a gas turbine engine, and circumferentially opposite sides defining a gap between each circumferentially adjacent segment, retention means coupling each of said seal segments to said inner casing so as to allow different axial movement between circumferentially adjacent segments;

whereby the VABI valve conical surface sealingly engages each of said sealing surfaces when closed.

5. The VABI seal of claim 4 further comprising biasing means biasing each of said seal segments towards the VABI valve.

6. The VABI seal of claim 5 wherein said biasing means, said retention means and said gaps allow axial twisting of said seal segments as said VABI valve closes.

7. The VABI seal of claim 4 wherein said bottom portion of each of said seal bodies further comprises a stepped portion having standoffs defining cooling air slots to cool said seal segment.

* * * * *